F. H. WHITE.
PHOTOPRINTING MACHINE.
APPLICATION FILED MAY 26, 1919.
1,340,511.
Patented May 18, 1920.
7 SHEETS—SHEET 3.
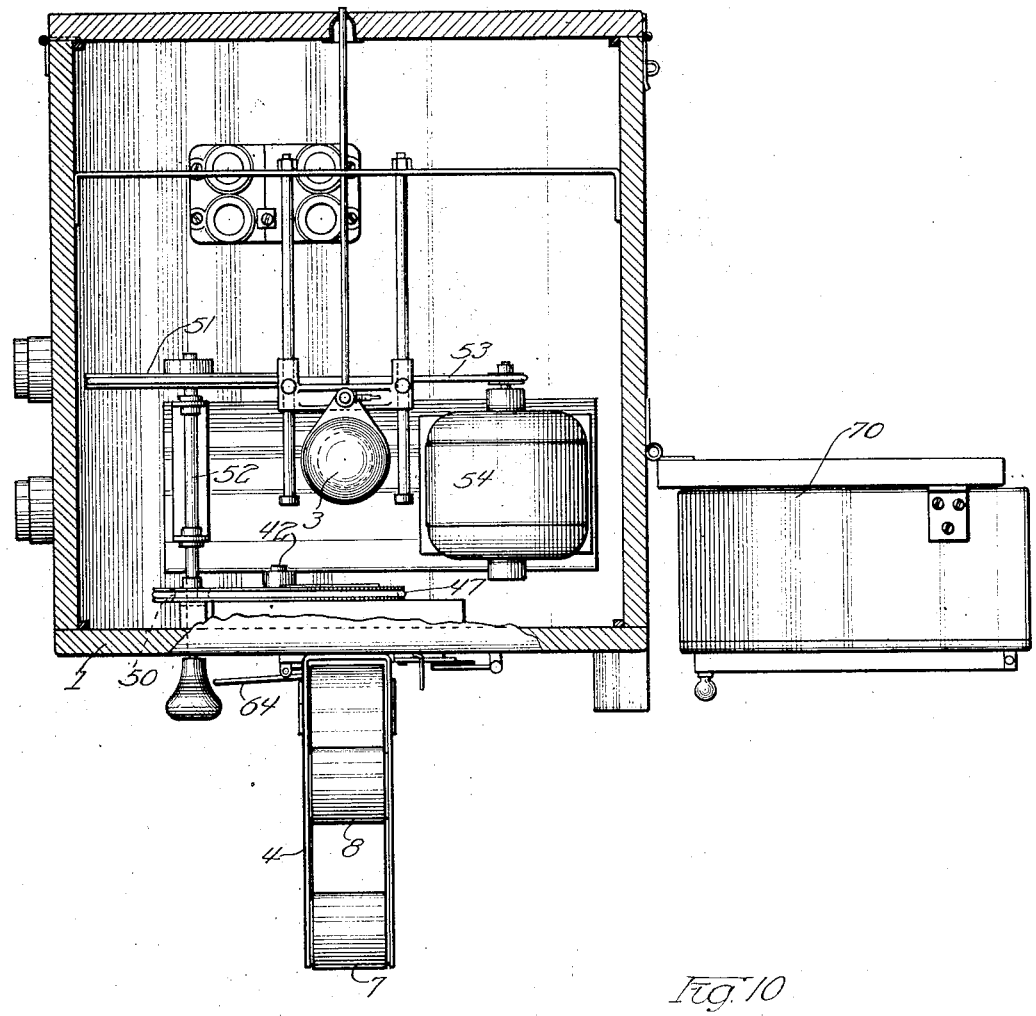
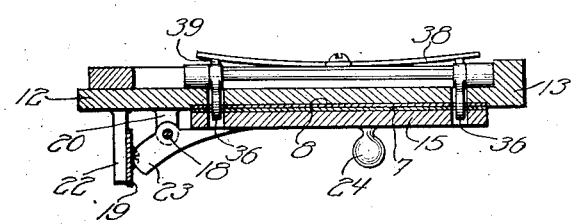
Inventor
Frederick H. White
By Cheever & Cox  Attys.

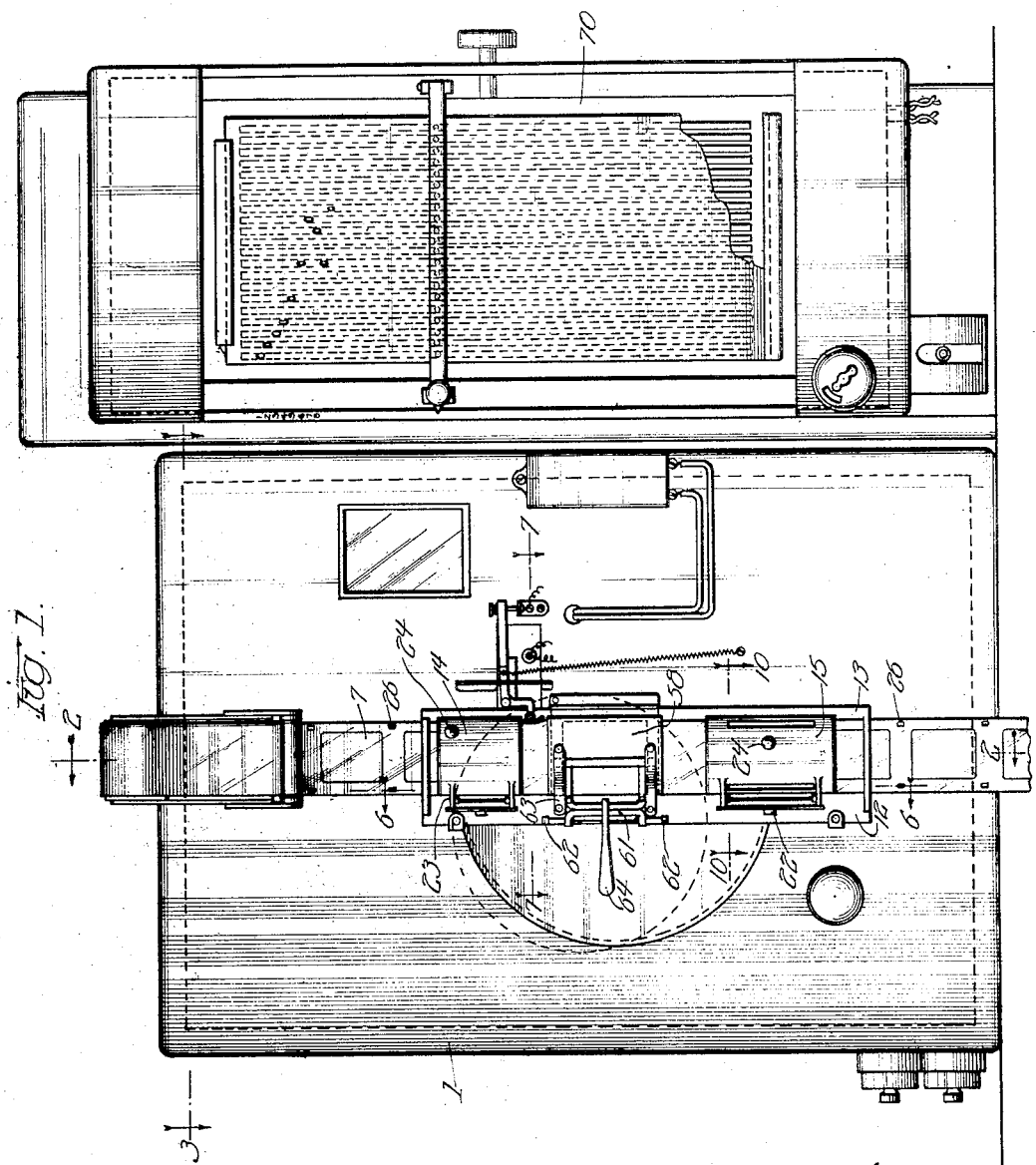

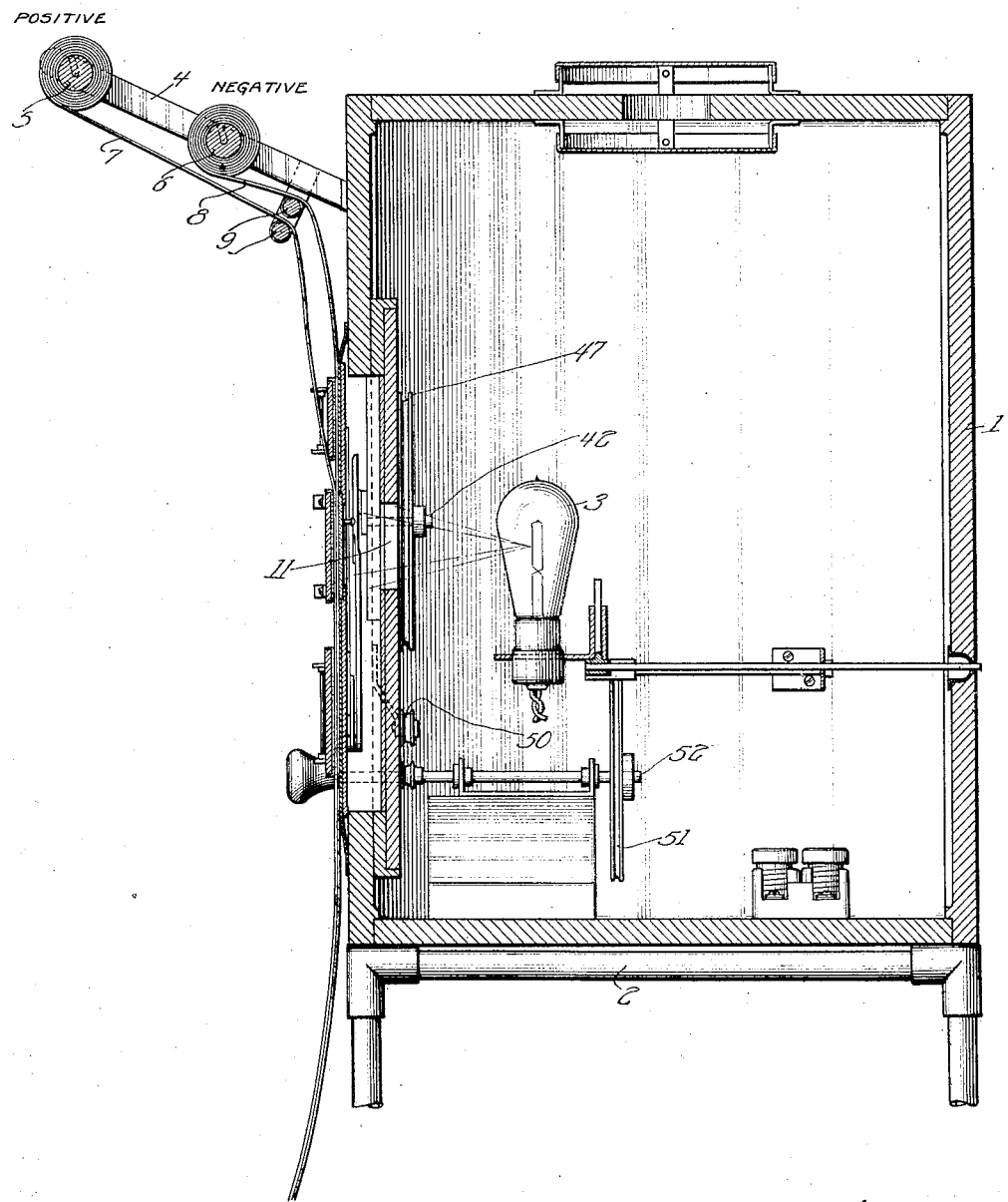

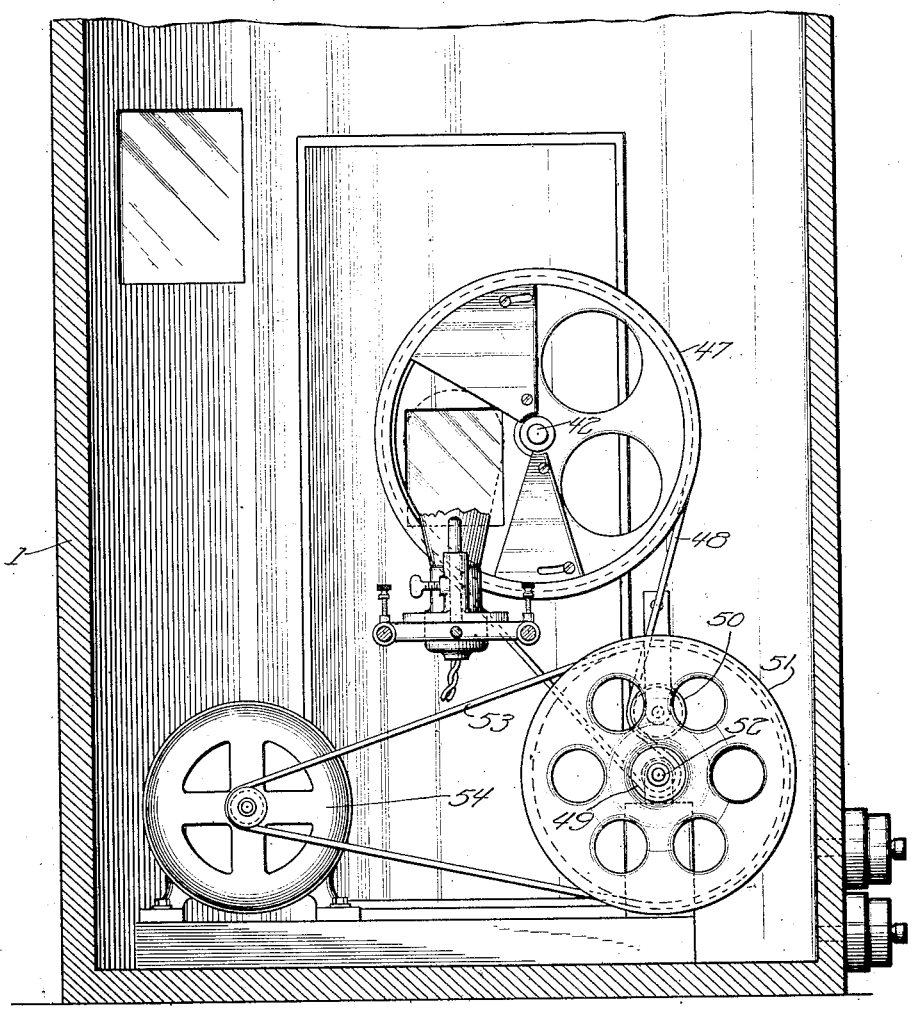

F. H. WHITE.
PHOTOPRINTING MACHINE.
APPLICATION FILED MAY 26, 1919.

1,340,511.

Patented May 18, 1920.

Inventor
Frederick H. White
By Cheever & Cox Attys

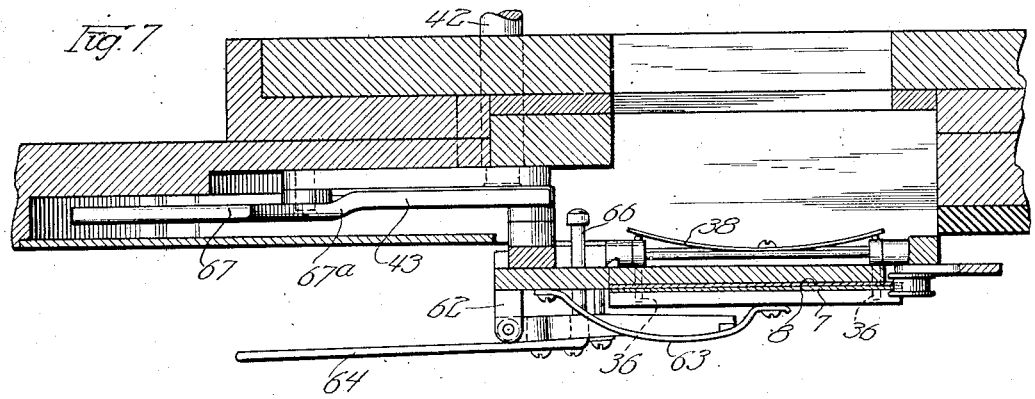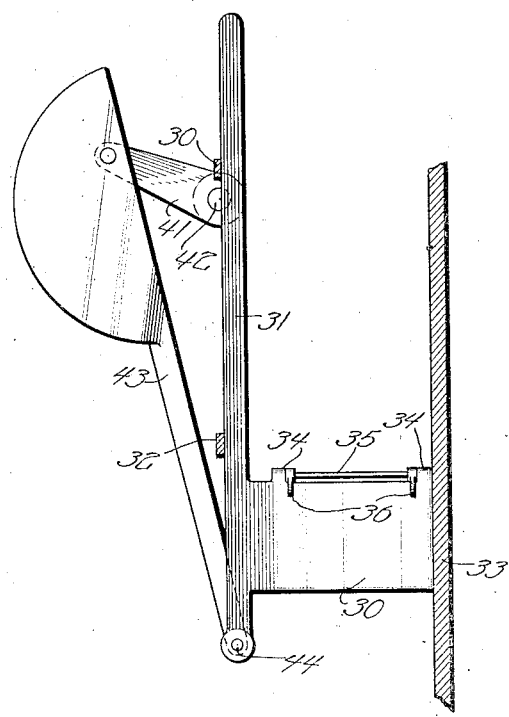

F. H. WHITE.
PHOTOPRINTING MACHINE.
APPLICATION FILED MAY 26, 1919.

1,340,511.

Patented May 18, 1920.
7 SHEETS—SHEET 7.

Inventor
Frederick H. White
By Cheever & Cox
Attys

UNITED STATES PATENT OFFICE.

FREDERICK H. WHITE, OF CHICAGO, ILLINOIS.

PHOTOPRINTING-MACHINE.

1,340,511.  Specification of Letters Patent.  Patented May 18, 1920.

Application filed May 26, 1919. Serial No. 299,955.

*To all whom it may concern:*

Be it known that I, FREDERICK H. WHITE, a citizen of the United States, residing at Chicago, in the county of Cook and State of Illinois, have invented a certain new and useful Improvement in Photoprinting-Machines, of which the following is a specification.

My invention relates to printing machines for producing a strip of positive film from a master strip of negatives. The general object of the invention is to provide means to facilitate the printing of a series of non-related views upon a strip of film capable of use in a stereopticon projecting machine of the type, for example, shown in my previous Patent No. 1,154,819. It is my purpose to render the mechanism automatic and to this end I have produced a number of subcombinations of elements which will be described in detail as the specification proceeds.

I acomplish my objects by the mechanism illustrated in the accompanying drawings in which—

Figure 1 is a front elevation of the complete machine.

Fig. 2 is a sectional elevation on the line 2—2, Fig. 1.

Fig. 3 is a plan section on the line 3—3, Fig. 1.

Fig. 4 is a sectional elevation taken from the back of the machine and showing the motor, shutter, and associated parts.

Fig. 7 is a plan section of the presser plate and associated parts taken on the line 7—7, Fig. 1.

Fig. 10 is a detail plan section taken on the line 10—10, Fig. 1.

Fig. 11 is a detail of the claw movement and means for reciprocating and guiding of same.

Like numerals denote like parts throughout the several views.

Figures 5, 6:
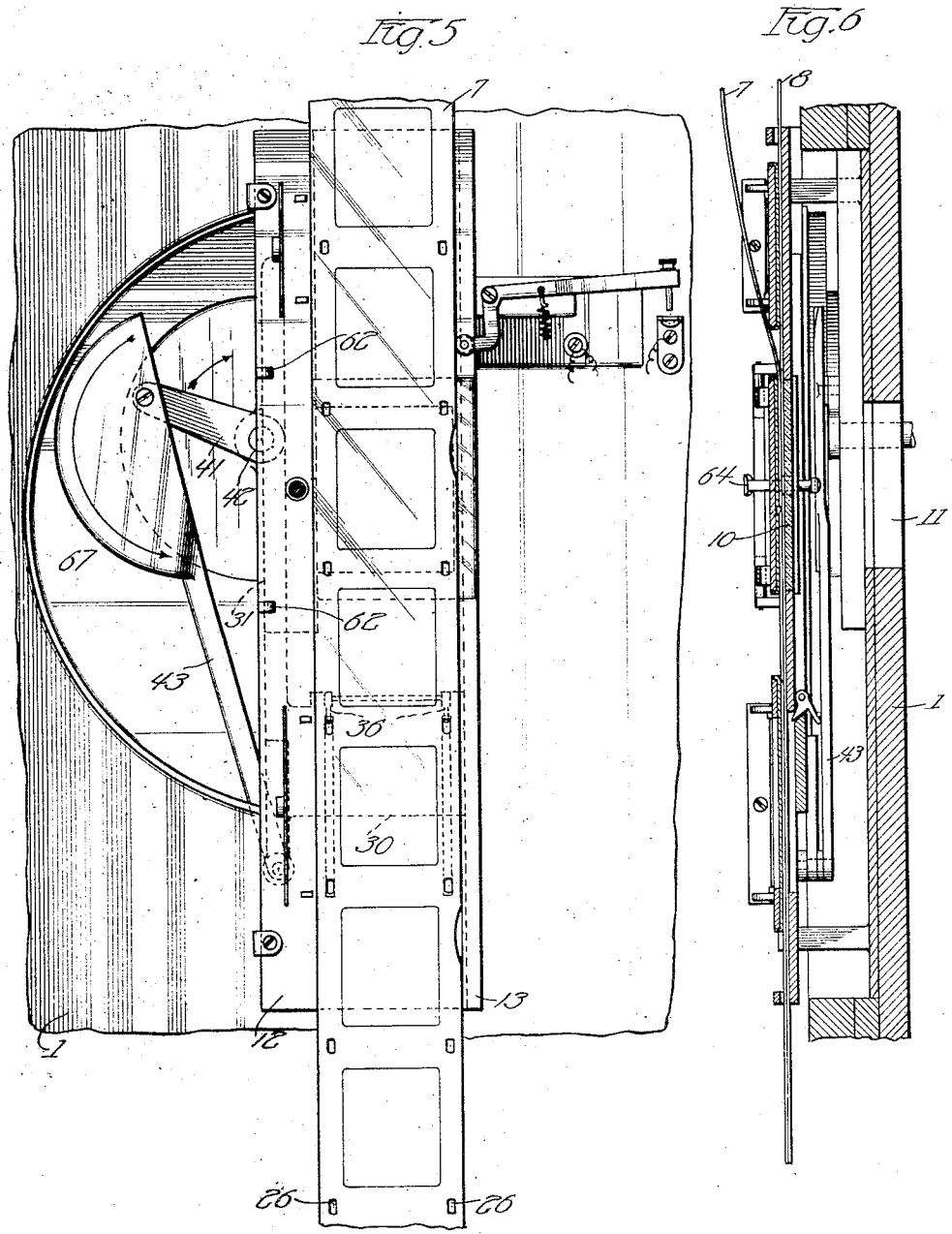
Fig. 5 is a face view of the unexposed positive strip of film together with the parts which guide and advance it and the negative strip.
Fig. 6 is a sectional elevation of the parts shown in Fig. 5, the plane of section being indicated by the line 6—6, Fig. 1.

In the form shown in the drawings to illustrate the principle of the invention, the operating mechanism is mounted within and upon a box 1 usually supported by some suitable type of stand or supporting frame or table 2. Mounted within this box or housing is a lamp 3 for producing the light by which the printing is to be accomplished. A bracket 4 mounted on the front of the box supports two reels 5 and 6, the reel 5 being adapted to carry a roll of unexposed positive films 7 and the reel 6 being adapted to carry a roll of the negative film 8.

Figure 9:
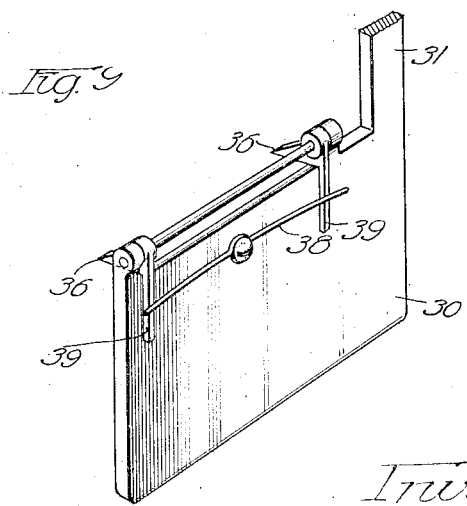
Fig. 9 is a perspective view of the claw movement for advancing the films.

The negative strip, in distinction to ordinary moving picture film, carries non-related views suitable for use in a stereopticon instead of a motion picture machine. The two films 7, 8 pass over guide rollers 9 to the outside of a glass plate 10 which is located in front of an opening 11 in the box through which the light of the printing lamp shines. The strips are guided by two vertically arranged stationary guides 12, 13 and are held in position between these guides by hinged keepers 14, 15. These keepers are substantially alike and are shown in cross sectional detail in Fig. 10. They are hinged upon pintles 18 carried by lugs 20 projecting from the guide bar 12. Leaf springs 19 are fastened at the middle to stationary brackets 22. The ends of the springs press against the tails 23 which are rigidly secured to the keepers and gently but constantly and yieldingly urge it to closed position. When it is desired to thread the film through the machine, preparatory to starting, the keepers are pulled back by means of handles 24. Both the negative and positive films have holes in them at suitable ends for receiving the claw mechanism by which the films are intermittently advanced. The claw mechanism is shown in perspective in Fig. 9, and in elevation in Fig. 11. It includes a plate 30 having an extension 31 at one side which is guided by stationary pin 32, 32. The other side of plate 30 is guided by a stationary guide 33. At the upper edge said plate has two lugs 34, 34, which support a shaft 35 which forms a pivot for two claws 36, 36. These claws are beveled at the top to cause them to be automatically forced out of the apertures 26 in the films when the claw mechanism moves upward. When the claw mechanism moves downward the claws automatically enter the holes 26 and cause the films to travel with them. The claws are normally held in acting position by means of a very light spring 38 fastened to the back of the plate and extending behind two arms 39, 39 which are integral with the claws. The vertical reciprocation of the claw mechanism is produced by a crank 41 having a stationary crank shaft 42 and pivotally connected at its free end to a pitman 43, the lower end of which is connected to plate 30 by means of a pivot pin 44. It will be evident that as the crank rotates the claw mechanism will travel vertically up and down.

The crank shaft 42 is driven by means of a sheave 47 best shown in Figs. 2, 3 and 4. Said sheave, which also constitutes a shutter as illustrated in Fig. 4, is driven by a belt 48, driven by a pulley 49, and passing over tightener pulley 50. Pulley 49 is driven by a sheave 51 which is fastened to the same shaft 52 as pulley 49. Sheave 51 is driven by a belt 53 which in turn is driven by a motor 54. Thus the claw mechanism and the shutter mechanism are driven from the same source of power and necessarily operate in timed relation.

Figure 8:
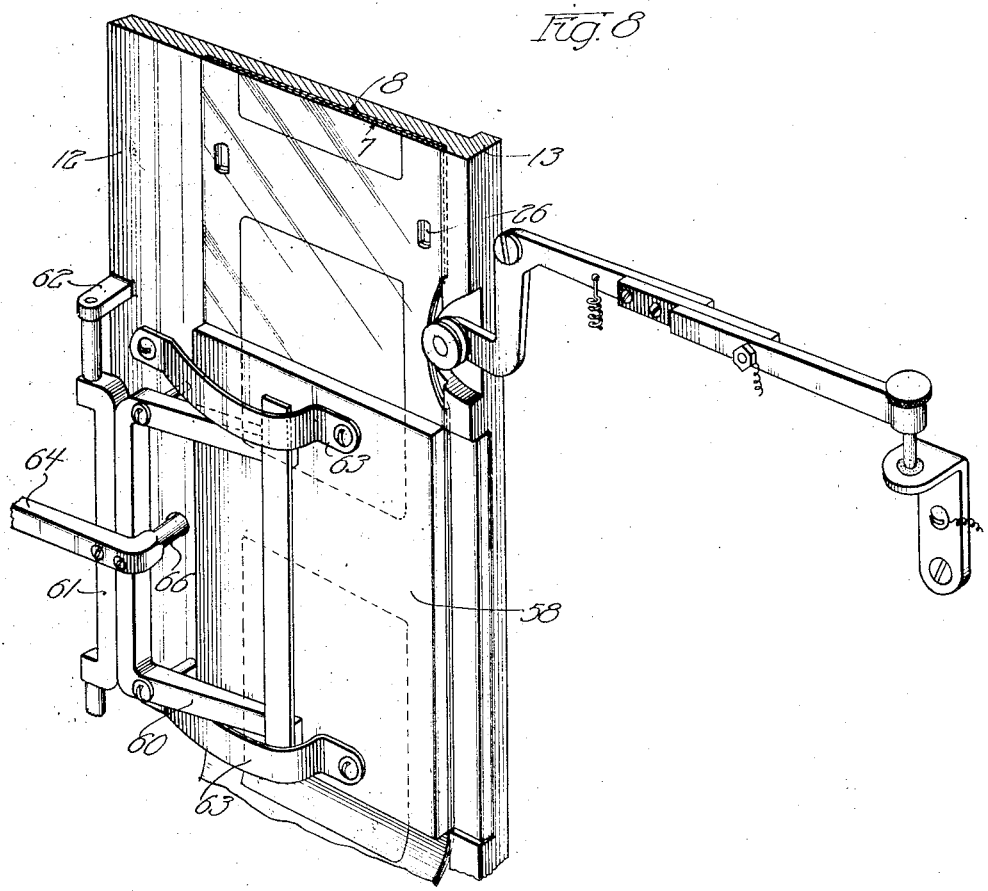
Fig. 8 is a perspective view of the parts shown in Fig. 7.

I have provided means for automatically obtaining close contact between the film to be printed and the negative during the printing period, and will now describe it:

A presser plate 58, shown in perspective in Fig. 8, is located behind the films in such manner that when pressed inward good contact is assured. This plate is located approximately midway between the upper and lower keepers 14, 15, and is supported upon a hinge which may assume various forms but is here shown as a yoke 60 fastened to the back of the plate and secured to an upright bar 61 which is pivotally mounted at its upper and lower ends in stationary brackets 62 projecting from the front of the guide 12. Plate 58 is normally held in closed or acting position by means of two leaf springs 63, 63 one end of which is secured to the back of the plate and the other to the guide 12. These springs create the necessary pressure but yield and release the films at the proper intervals by releasing mechanism which is automatic in its action. The plate may also be released manually by means of a hand lever 64 fastened to the parts 60, 61 as shown in Figs. 7 and 8. The automatic releasing mechanism includes a pin 66 which is integral with the hand lever 64 and passes through a suitable aperture in guide 12 to the inside of the box. The head of the pin is located in position to be engaged by a cam 67 which, according to the present design, is an integral part of the pitman 43. The acting portion 67ª of said cam is best shown in Fig. 7. The construction is such that as the crank 41 rotates it brings the cam surface 67ª across the end of pin 66 and pushes the pin outward sufficiently to release the two films to permit the claw action to advance them to the next succeeding printing position.

It is desirable but not essential to provide means for regulating the intensity of the printing lamp 3. Such means are indicated in general at 70, Figs. 1 and 3, but as devices of this character are known and form no essential part of the present invention they need not be here described.

In operation, the reels 5 and 6 with the films wound thereon are first positioned as shown in Fig. 2, after which the ends of the films are brought over the guide rollers 9 and thence passed down successively behind the keeper 14, the presser plate 58, and the keeper 15. The guides 12 and 13 hold the films in register, laterally, and after they are in place, the operator releases said parts 14, 58, and 15, and their respective springs move them to acting position as shown in Fig. 1. The operator then starts the motor 54 after which the action is automatic. The shutter 47 rotates to alternately expose and cut off the light from the film and, acting in synchronism with the shutter, the claw mechanism shown in perspective in Fig. 9 advances the film at proper intervals. While the film is stationary the presser plate 58 holds the positive and negative films in close contact. After the proper interval of exposure, the cam shoulder 67ª engages pin 66 and forces the presser plate 58 back sufficiently to relieve the pressure and permit the claw mechanism to advance the film. In advancing the film, the claws 36 enter the apertures 26 in the margin of the film. As soon as the film has traveled far enough, the claws commence their upward or return movement. As the upper edge of the claws is beveled, the upper margin of the apertures in the film automatically forces the claws out of engagement and permits the claw mechanism to rise without moving the film upward. About the time the claw mechanism starts to ascend, the push pin 66 is disengaged by the cam 67, thus permitting the springs 63 to hold the films against upward movement while the claws are ascending.

It will be evident that as soon as the films have been properly positioned in the machine, the printing operation will be entirely automatic. It is also evident that not only is the mechanism synchronized with certainty, but the parts are comparatively simple and hence incur little risk of getting out of order.

Having thus described my invention what I claim as new and desire to secure by Letters Patent, is:

1. A photoprinting machine adapted to print apertured strips of photographic films from negatives having nonrelated views adjacent to each other, said machine having claw mechanism adapted to reciprocate in a straight line to engage and advance the film, said mechanism having claws with inclined edges adapted, on the return movement of the claws, to engage an edge of the apertures in the film whereby the claws are automatically cammed out of engagement for their return movement.

2. A photoprinting machine adapted to print apertured strips of photographic films from negatives having nonrelated views adjacent to each other, said machine having a plate reciprocating in a plane, and claws pivoted to said plate, said claws having an acting edge adapted to engage in the apertures of the film for advancing the film when moving in one direction and having beveled edges adapted on the return movement of the claws to engage an edge of the apertures in the film to automatically throw the claws out of engagement with the film when moving in the return direction.

3. A photoprinting machine adapted to print apertured strips of photographic films from a strip of negatives having nonrelated views adjacent to each other, said machine having a presser plate for obtaining close contact during the printing period, shutter mechanism, and a cam actuated by said shutter mechanism for causing the presser plate to periodically release the film.

4. A photoprinting machine adapted to print apertured strips of photographic films from strips of negatives having non-related views adjacent to each other, said machine having a spring actuated presser plate normally tending to hold the films in close contact for printing purposes, a rotatable shutter, and a cam actuated by said shutter for causing the presser plate to periodically release the film, said cam being rotatable and rotating in synchronism with the shutter.

5. A photoprinting machine adapted to print apertured strips of photographic films from strips of negatives, said machine having rectilinearly reciprocating claws adapted to automatically engage and disengage the film, a presser plate for obtaining close contact of the films during the printing period, and means operating in synchronism with said claws for releasing the pressure of said plate against the films.

6. A photoprinting machine adapted to print apertured strips of photographic films from strips of negatives, said machine having rectilinearly reciprocating claws adapted to automatcially engage and disengage the film, a presser plate for obtaining close contact of the films during the printing period, a rotatable cam operating in synchronism with said claws for releasing the pressure of said plate against the films, and a shutter operating in synchronism with said presser plate.

7. In a photoprinting machine, in combination, claw mechanism having claws adapted to automatically engage and disengage apertured strips of films, means for causing said claws to reciprocate in a straight line, a rotating shutter, a presser plate for normally holding the sensitized film in close contact with the negative, and a cam actuated by the shutter and pivotally connected to the claw mechanism for releasing said presser plate intermittently.

8. In a photoprinting machine, in combination, a claw plate rectilinearly reciprocable, claws pivotally mounted on said plate and having an acting edge adapted to advance apertured strips of film, said claws being yieldable when moving in the return direction, to thereby automatically release the film, a rotatable shutter, a crank connected to and rotating in synchronism with said shutter, a pitman connected to the claw plate for reciprocating it, a presser plate for obtaining close contact during printing, and a cam actuated by said pitman for releasing the pressure of the presser plate.

9. A photoprinting machine adapted to print apertured strips of photographic films from negatives having nonrelated views adjacent to each other, said machine having a rotatable shutter, a presser plate movable to effect printing contact between the negative and positive films, claw mechanism having claws adapted to enter the apertures in the films for advancing them, said claw mechanism having a plate adapted to reciprocate in a plane, and correlating means for causing said parts to move in synchronism.

10. A photoprinting machine adapted to print apertured strips of photographic films from negatives having non-related views adjacent to each other, said machine having claw mechanism including a reciprocable claw, the front of the claw being adapted to engage one edge of the apertures in the film for advancing the film when the claw is moved forward, the back part of the claw being beveled whereby, on its return movement, it engages the opposite edge of the apertures in the film and the claw is thereby automatically cammed out of engagement with the film.

In witness whereof I have hereunto subscribed my name.

FREDERICK H. WHITE.